United States Patent [19]

Ikegaya

[11] Patent Number: 4,871,137
[45] Date of Patent: Oct. 3, 1989

[54] SEAT LIFTING APPARATUS

[75] Inventor: Isao Ikegaya, Kosai, Japan

[73] Assignee: Fujikiko Kabushiki Kaisha, Tokyo, Japan

[21] Appl. No.: 217,163

[22] Filed: Jul. 11, 1988

[30] Foreign Application Priority Data

Jul. 31, 1987 [JP] Japan .............................. 62-117969[U]

[51] Int. Cl.$^4$ ............................................. A45D 19/04
[52] U.S. Cl. .................................. 248/396; 248/394; 297/325
[58] Field of Search ............... 248/371, 396, 397, 394, 248/421, 419, 371, 395, 372.1, 393; 297/313, 325, 330

[56] References Cited

U.S. PATENT DOCUMENTS

| 4,159,095 | 6/1979 | Pallant | 248/421 X |
| 4,422,611 | 12/1983 | Kitsuda | 248/395 X |
| 4,438,895 | 3/1984 | Rees | 297/325 X |
| 4,445,661 | 5/1984 | Langmesser | 248/396 X |
| 4,643,383 | 2/1987 | Fukuta | 248/421 X |
| 4,648,578 | 3/1987 | Sakamoto | 248/396 X |
| 4,720,070 | 1/1988 | Nishino | 248/394 |

FOREIGN PATENT DOCUMENTS 60-16622  2/1985  Japan .
60-90030  6/1985  Japan .

Primary Examiner—J. Franklin Foss
Attorney, Agent, or Firm—Foley & Lardner, Schwartz, Jeffery, Schwaab, Mack, Blumenthal & Evans

[57] ABSTRACT

A seat lifting apparatus comprises a seat lifting device disposed between a base frame and a seat frame attached onto a seat side, and independently moving up or down the front and rear sides of the seat frame; front and rear shafts disposed in the seat lifting device and respectively disposed on the front and rear sides of the seat to support the seat; front and rear engaging devices respectively disposed in the front and rear shafts; and a resilient device connected between the front and rear engaging device and balancing the lifting operation of the seat on the front and rear sides thereof.

A seat lifting apparatus also comprises a seat lifting device disposed between a lower frame and an upper frame disposed above the lower frame and attached onto a seat side, and moving the upper frame up or down; a gear rotatably supported by the lower frame; a plate rotatable in association with the rotation of the gear and detachably attached to the gear; and a shaft disposed in the seat lifting device and fixed to the plate, the shaft being rotated by the rotation of the plate to move the upper frame up or down.

12 Claims, 6 Drawing Sheets

SEAT LIFTING APPARATUS

The present invention relates to a seat lifter for independently adjusting the heights of the front and rear sides of a seat, and in particular, to a seat lifter in which a resilient member for balancing the seat is improved when the heights of the front and rear sides of the seat are adjusted.

BACKGROUND OF THE INVENTION

A conventional seat lifter used for a seat of a vehicle is disclosed in the Japanese Laid-Open Utility Model Nos. 60-16622 and 60-90030, for example, in which the front and rear sides of the seat are independently lifted up.

In these seat lifters, a balance spring is disposed between one side frame and a connecting shaft on the rear end side, and between the other side frame and a connecting shaft on the front end side so as to smoothly perform lifting operations in front and rear end portions of the seat frame.

One end of each of the balance springs is engaged with a projected hook disposed in the connecting shaft on the front and rear end sides of the seat frame, and the other end of each of the balance springs is engaged with a projected hook disposed in the right and left side frames.

Accordingly, the balance springs are individually disposed with respect to front and rear end lifts in the independent seat lifters on the front and rear sides of the seat. Thus, the space for disposing the balance springs therein must be fairly large, the mechanism thereof is complicated, the number of parts is large, and the weight is also heavy, thereby increasing the manufacturing cost of the seat.

The seat lifter is an apparatus for raising and lowering a seat cushion within a certain height range from the floor of the vehicle, and is constituted to secure an optimum driving position for the driver. The seat lifter of this kind is composed of a first type in which front and rear portions of the seat cushion are independently adjusted to be raised or lowered, and a second type in which only the front portion of the seat cushion can be raised or lowered. In the first type, a pair of operating portions for adjusting the raising and lowering operations of the seat cushion are disposed to individually operate the front and rear portions of the seat cushion.

In the conventional seat lifter of the first type, a lower frame is directly fixed to a chassis, or is fixed to the chassis through a slide rail. An upper frame for fixing the seat cushion thereto is disposed above the lower frame such that the upper frame can be raised or lowered through right and left links on the front and rear sides thereof. Sector gears for raising the links are respectively fixed by welding to connecting shafts for connecting the right and left links to each other, and can be rotated through pinions of a pair of spring brake devices rotatably supported by the upper frame. Each of the spring brake devices has a knob for rotating the device at one end thereof and adjusting the raising and lowering operations of the seat, and a pinion engaged with each sector gear at the other end of the device so that each spring brake device is rotatably supported by the upper frame. In addition, each spring brake device has a brake unit between the pinion and the knob. Accordingly, when the knob is rotated, the pinion and the sector gear are rotated so that the link connected to the sector gear is raised and the other link is thereby moved in association therewith through the connecting shaft. Thus, the front or rear portion of the upper frame can be raised or lowered within a constant range, and the upper frame can be fixed in a desired setting position However, in the conventional seat lifter mentioned above, the upper and lower frames are respectively composed of right and left side frames, and are overlapped through links in both right and left side portions forming a rectangle. The right and left links are respectively connected to connecting shafts on the front and rear sides of the upper and lower frames. A stereo-frame structure is thus formed, and is delivered as a completed product to a purchaser from a manufacturer. At the present time, the volume of a number of seat lifters is large, and the transporting cost thereof is thereby increased. The so called knock-down system is used in which the seat lifter is disassembled and delivered to the purchaser, and is then reassembled by the purchaser when the seat lifter is attached within a vehicle. However, in the conventional seat lifter, the connecting shafts and the sector gears are fixed by welding them to each other, and are thus integrally formed, so that they cannot be disassembled and assembled thereafter, or the assembling operation is greatly complicated since these members are not constructed to be disassembled and assembled thereafter.

Accordingly, the conventional seat lifter is not appropriately designed to be transported in a disassembled state so that it is necessary to improve the seat lifter for the knock-down system. Namely, the seat lifter must be constructed such that it is not necessary for the purchaser to perform welding operations and new working operations of the seat lifter, and such that the seat lifter is easily assembled.

SUMMARY OF THE INVENTION

To solve the problems mentioned above, an object of the present invention is to provide a compact seat lifter for independently adjusting the heights of the front and rear sides of a seat.

Another object of the present invention is to provide a seat lifter for independently adjusting the heights of the front and rear sides of a seat, in which the number of parts is reduced.

Another object of the present invention is to provide a seat lifter for independently adjusting the heights of the front and rear sides of a seat, in which the weight of the seat lifter is reduced.

Another object of the present invention is to provide a seat lifter for independently adjusting the heights of the front and rear sides of a seat, in which the seat lifter can be manufactured at a relatively low cost.

Another object of the present invention is to provide a seat lifter which can be transported in a disassembled state for a knock-down system in such a way that the seat lifter can be easily reassembled.

With the above objects in mind, the present invention resides in a seat lifting apparatus comprising seat lifting means disposed between a base frame and a seat frame attached onto a seat side, and independently moving up or down the front and rear sides of the seat frame; front and rear shaft means disposed in the seat lifting means and respectively disposed on the front and rear sides of the seat to support the seat; front and rear engaging means respectively disposed in the front and rear shaft means; and resilient means connected between the front and rear engaging means and balancing the lifting operation of the seat on the front and rear sides thereof.

The present invention also resides in a seat lifting apparatus comprising seat lifting means disposed between a lower frame and an upper frame disposed above the lower frame and attached onto a seat side, and moving the upper frame up or down; gear means rotatably supported by the lower frame; plate means rotatable in association with the rotation of the gear means and detachably attached to the gear means; and shaft means disposed in the seat lifting means and fixed to the plate means, said shaft means being rotated by the rotation of the plate means to move the upper frame up or down.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will be now described with reference to the accompanying drawings.

Figure 1:
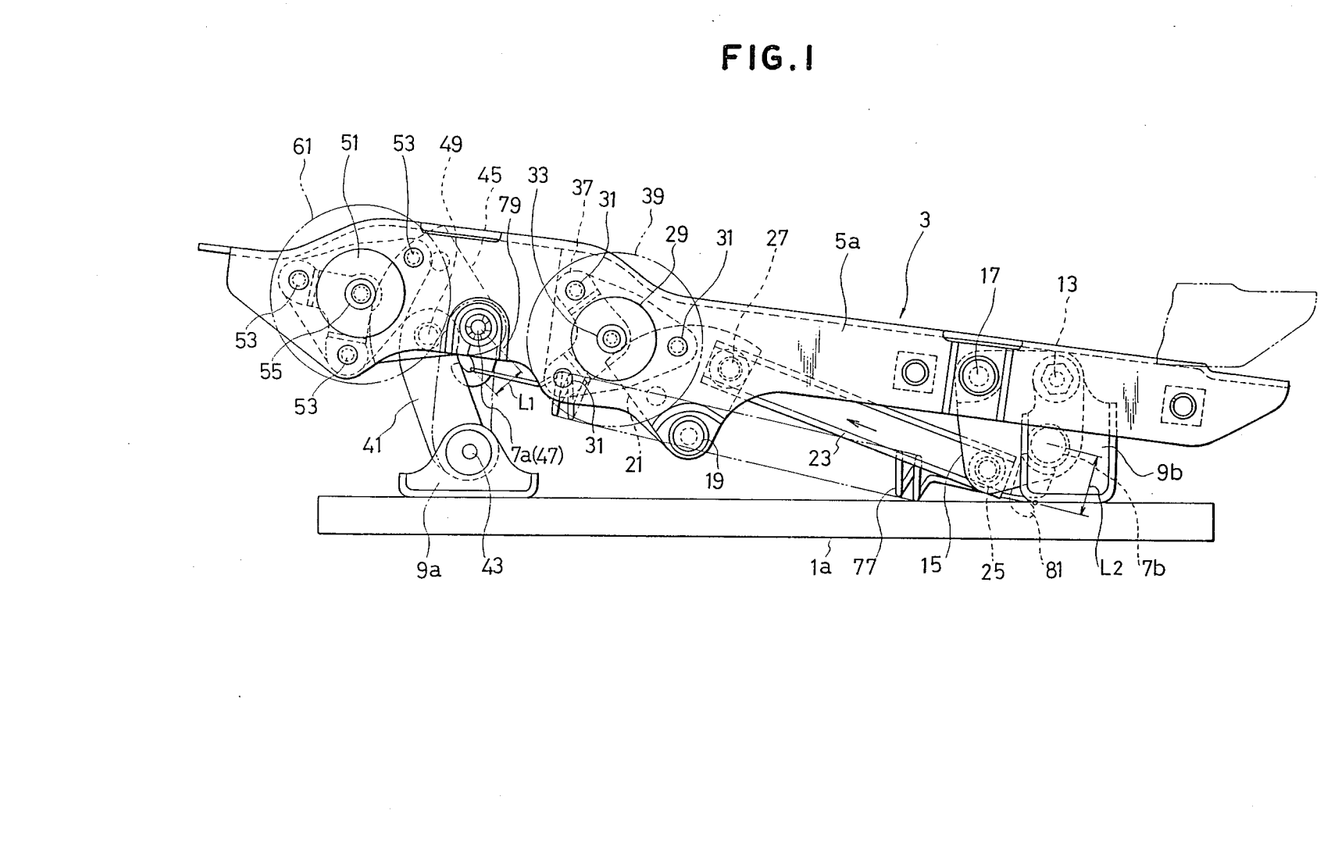
FIG. 1 is a side view showing a seat lifter in accordance with one embodiment of the present invention.
Figure 2:
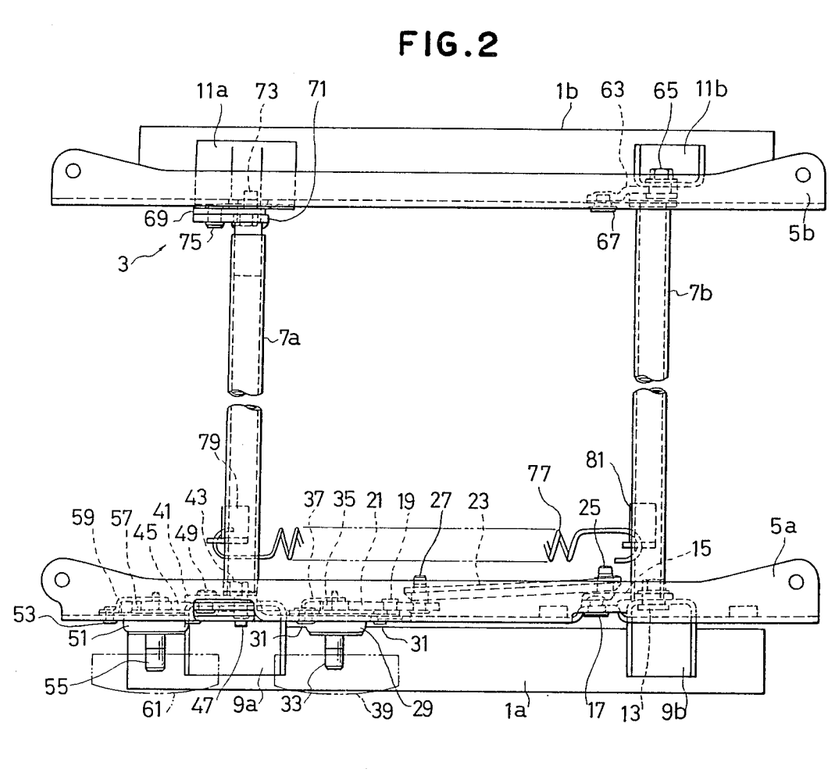
FIG. 2 is a plan view of the seat lifter of FIG. 1.

In FIGS. 1 and 2, a pair of upper rails 1a and 1b of a seat slide as a base frame are disposed on a chassis side, and a seat frame 3 is disposed above the upper rails 1a and 1b. The seat frame 3 is constituted by a pair of right and left side frames 5a and 5b, and connecting rods 7a and 7b for respectively connecting the approximately front and rear ends of the side frames 5a and 5b. Brackets 9a and 9b and 11a and 11b are fixed by unillustrated fasteners to front and rear portions of the upper rails 1a and 1b.

A rear link 15 is rotatably attached at one end thereof through a pin 13 to the upper end of the bracket 9b, on the right hand side thereof in FIG. 1, on the rear side of the seat lifter. The other end of the rear link 15 is rotatably attached to a rear end portion of the side frame 5a through a pin 17. Namely, the rear link 15 is rotated around the pin 13 as a fulcrum in the clockwise direction in FIG. 1, thereby raising the rear end portion of the side frame 5a.

A rear sector gear 21 is rotatably attached through pin 19 to the side frame 5a on the front side of the rear link 15, i.e., on the left hand side thereof in FIG. 1. The rear link 15 and the rear sector gear 21 are connected to each other through a connecting rod 23. Namely, one end of the connecting rod 23 is rotatably attached to the rear link 15 through a pin 25, and the other end of the connecting rod 23 is rotatably attached to the rear sector gear 21 through a pin 27.

A rear brake unit 29 is attached by a plurality of pins 31, such as three pins, to the side frame 5a from the inner side thereof in a position adjacent to the rear sector gear 21. In FIG. 2, the left hand side shows the front side, and the right hand side shows the rear side. As shown in FIGS. 1 and 2, the rear brake unit 29 includes a rear operating shaft 33 rotatable in the normal and reverse rotational directions, and a rear drive gear 35 integrally and coaxially rotated together with the rear operating shaft 33 and engaged with the rear sector gear 21. A support member 37 is disposed inside the side frame 5a to support the rear operating shaft 33 at both ends thereof. An operating knob 39 is attached to the rear operating shaft 33 at the side end thereof, i.e., at the lower end thereof in FIG. 2.

The rear brake unit 29 locks the rear operating shaft 33 in an arbitrary angular position if the operating force of the operating knob 39 is released, while allowing normal and reverse rotations of the rear operating shaft 33.

A front link 41 is rotatably attached at one end thereof by a pin 43 to the bracket 9a on the front side of the seat lifter. A front sector gear 45 is rotatably attached by a pin 47 to the side frame 5a in a position in front of the rear brake unit 29, i.e., in a leftward position in FIG. 1. Further, the other end of the front link 41 is rotatably attached to the front sector gear 45 by a pin 49.

A front brake unit 51 is attached to the side frame 5a in a position adjacent to the front sector gear 45, and approximately has the same structure as the one of the rear brake unit 29.

The front brake unit 51 is attached by a plural pins 53, such as three pins, to the side frame 5a from the inner side thereof. The front brake unit 51 also includes a front operating shaft 55 rotatable in the normal and reverse directions, and a front drive gear 57 integrally and coaxially rotated with the front operating shaft 55 and engaged with the front sector gear 45.

A support member 59 is disposed inside the side frame 5a to support the front operating shaft 55 at both ends thereof. An operating knob 61 is attached to the front operating shaft 55 at the side end thereof, i.e., at the lower end thereof in FIG. 2. Accordingly, the front brake unit 51 locks the front operating shaft 55 in an arbitrary angular position if the operating force of the operating knob 61 is released, while allowing normal and reverse rotations of the front operating shaft 55.

In accordance with the structure mentioned above, when the front drive gear 57 is rotated in the counterclockwise direction in FIG. 1, the front portion of the side frame 5a is lifted.

The above description relates to the construction of the side frame 5a, but the structure of the side frame 5b follows the movement of the side frame 5a, and is therefore constituted by a minimized link mechanism as shown in FIG. 2.

A rear link 63 has approximately the same shape as that of the corresponding rear link 15, and is rotatably attached at one end thereof by a pin 65 to the bracket 11b on the rear side of the seat lifter. The other end of the rear link 63 is rotatably attached by a pin 67 to the side frame 5b. The distance between the pins 65 and 67 is set to be approximately equal to the distance between the pins 13 and 17 in FIG. 2.

A front link 69 corresponding to the front link 41 is rotatably attached to the bracket 11a on the front side of the seat lifter. An auxiliary link 71 corresponding to the front sector gear 45 is rotatably attached by a pin 73 to the side frame 5b. The front link 69 and the auxiliary link 71 are connected to each other by a pin 75, and the distance between the pins 73 and 75 is set to be approximately equal to the distance between the pins 47 and 49 in FIG. 2.

As shown in FIG. 2, both the pins 15 and 63 are integrally connected to each other by the rod 7b, and the front sector gear 43 and the auxiliary link 71 are integrally connected to each other by the rod 7a A balance spring 77 is disposed in a portion between the rods 7a and 7b for respectively connecting the side frames 5a and 5b in the approximately front and rear portions thereof, such as on the lower sides of the rods, so as to smoothly perform the lifting operation of the seat frame 3 in the front and rear end portions thereof.

As shown in FIG. 2, the balance spring 77 is of a tension coil spring type, and is engaged at one end thereof with a projected hook 79 disposed as an engaging member in the rod 7a, and is engaged at the other end thereof with a projected hook 81 disposed as an engaging member in the rod 7b. As shown in FIG. 1, the arm length from the center of the rod 7a to the hook 79 engaged with one end of the balance spring 77 is designated by $L_1$, and the arm length from the center of the rod 7b to the hook 81 engaged with the other end of the balance spring 77 is designated by $L_2$ The arm length $L_2$ of the hook 81 is set to be longer than the arm length $L_1$ of the hook 79.

When an operator sits on the seat, the force of the balance spring 77 is increased on the rear side of the seat, and is decreased on the front side of the seat, thereby balancing the lifts at the front and rear ends of the seat. Namely, the backward balance spring 77 is set to move so as not to adversely affect the spring in relation to the moved amount of the lift at the front end of the seat.

As a result, the balance spring in this embodiment can be disposed in a small space in comparison with the conventional balance spring, the number of parts can be reduced, and the weight can be also reduced, thereby manufacturing the seat lifter at a relatively low cost.

The operation of the seat lifter will be described next.

To lift When the rear end side of the seat frame 3, the operating knob 39 on the rear side is rotated in the clockwise direction from the state shown in FIG. 1. When the operating knob 39 is rotated in the clockwise direction, the rear sector gear 21 is rotated around the pin 19 in the counterclockwise direction, and the connecting rod 23 is pulled forwards, i.e., leftwards as shown by the arrow in FIG. 1. Accordingly, the rear link 15 is rotated around the pin 13 in the clockwise direction, and the rear end side of the seat frame 3 is lifted up towards the uppermost raised position thereof in FIG. 1.

At this time, the front link 41 is slightly rotated to allow the rear end side of the seat frame 3 to lift, but the front link 41 undergoes virtually no displacement in the direction of height thereof.

When the operating force of the operating knob 39 is released, the seat frame 3 can be locked in an arbitrary position in height, and the seat frame 3 is lowered down if the operating knob 39 is reversely rotated.

To lift the front end side of the seat frame 3, the operating knob 61 on the front side is rotated in the clockwise direction from the state of FIG. 1. When the operating knob 61 is rotated in the clockwise direction, the front sector gear 45 is rotated around the pin 47 in the counterclockwise direction, so that the pin 47 as a connecting portion between the front sector gear 45 and the side frame 5a is moved upwards. Therefore, the front end side of the seat frame 3 is lifted up towards the uppermost raised position in FIG. 1. At this time, the pin 13 on the rear side functions as a rotary fulcrum of the side frame 5a.

Further, when the operating force of the operating knob 61 is released, the front end side of the seat frame 3 can be locked in an arbitrary position in height, and the seat frame 3 is lowered down when the operating knob 61 is reversely rotated.

In accordance with the embodiment of the present invention mentioned above, independent operating systems are separately disposed on the rear and front sides of the seat, so that one seat lifting device can be lifted up and lowered down irrespective of the position in height of the other seat lifting device.

The present invention is not limited to the embodiment mentioned above, but it may be changed in various modifications within the scope of the invention.

As mentioned above, in accordance with the present invention, balance springs for positioning up or down front and rear ends of a seat lifter are disposed in front and rear connecting shafts through engaging members, so that the seat lifter can be disposed within a small space in comparison with the conventional seat lifter, and the number of parts and the weight of the seat lifter are reduced, thereby manufacturing the seat lifter at a relatively low cost.

Figure 3:
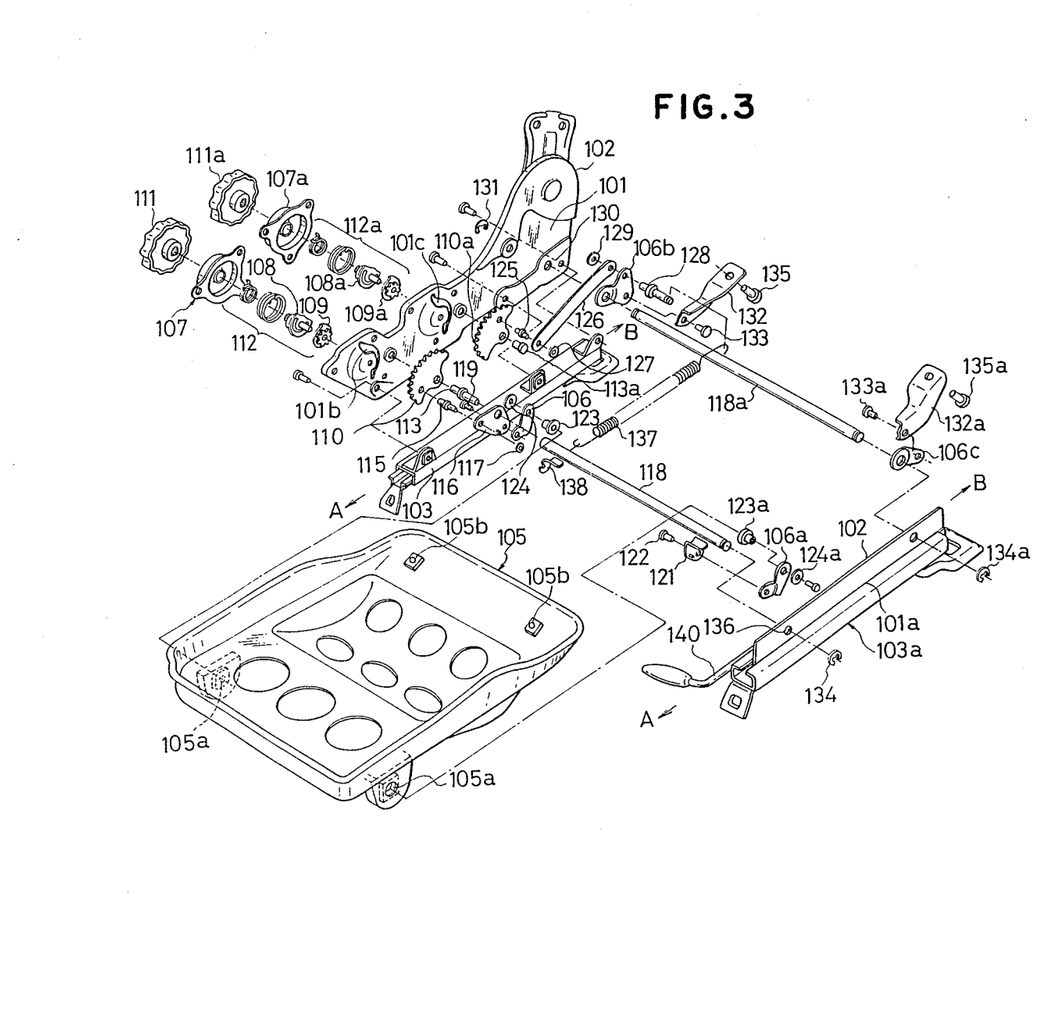
FIG. 3 is an exploded perspective view of a seat lifter embodiment of the present invention.
Figure 4:
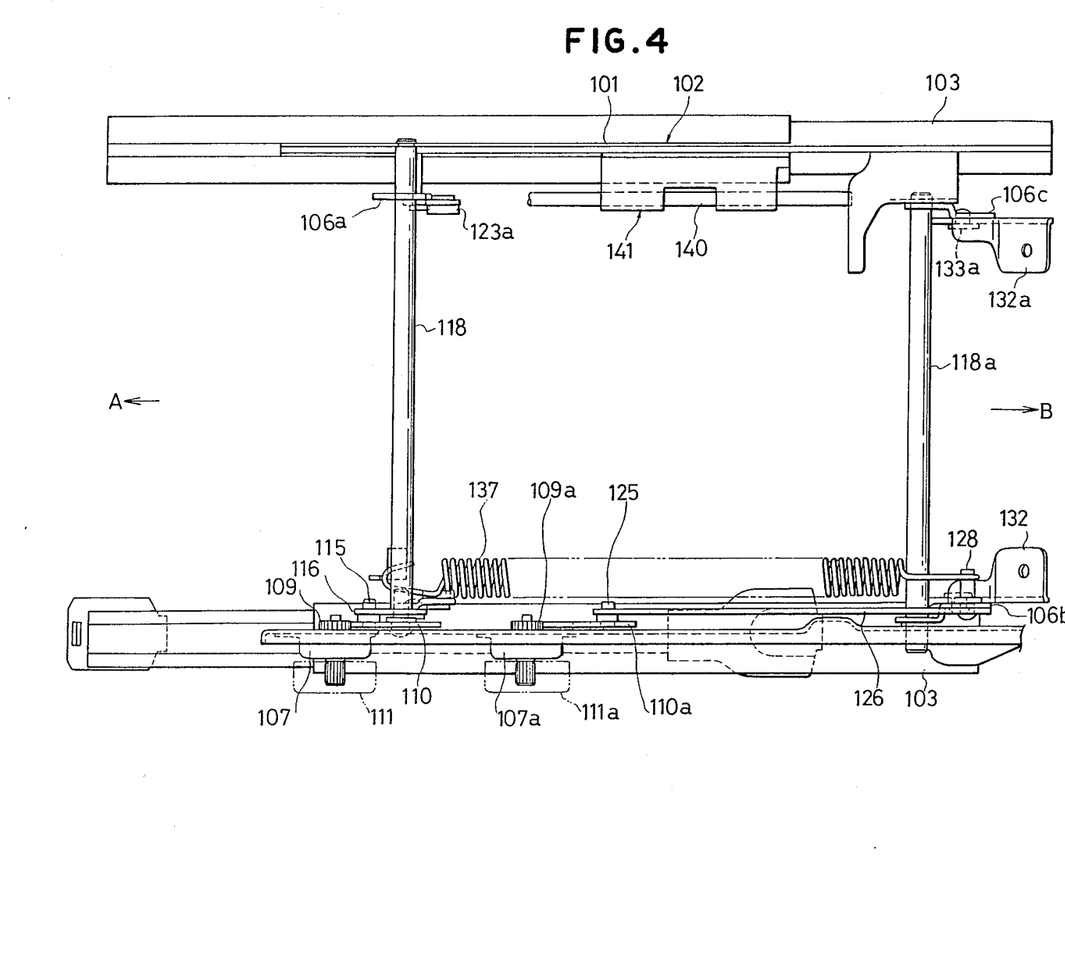
FIG. 4 is a plan view of the seat lifter of FIG. 3.
Figure 5:
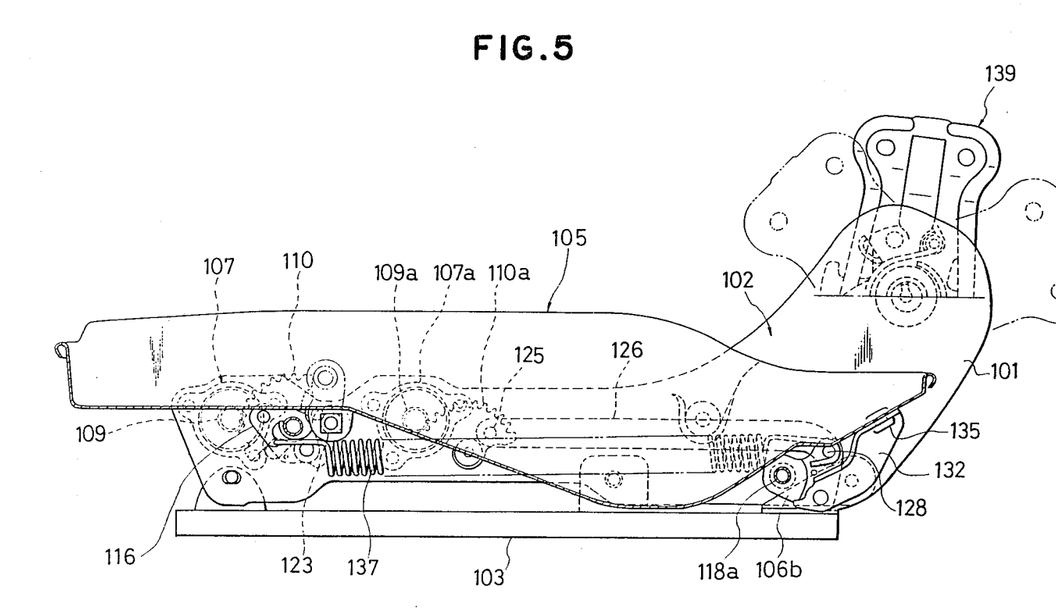
FIG. 5 is a cross-sectional view of the seat lifter on the lower side of FIG. 4.

FIGS. 3 to 5 show another embodiment of the present invention. A lower frame 102 is composed of a reclining lower plate 101 and an upper slide rail 101a, and is movably attached to right and left slide rails 103 and 103a fixed to a chassis in the front and rear directions, i.e., in the directions of arrows A and B. The lower frame 102 may be directly fixed to the chassis through a bracket without the slide rails 103 and 103a. An upper frame 105 composed of a shallow container is disposed between the reclining lower plate 101 and the upper slide rail 101a, and can be raised and lowered on the lower frame 102 through right and left links 6, 6a, 6b and 6c in the front and rear directions. The upper frame 105 is constituted by a shallow container, but may be constituted by right and left side supports. Spring brake devices 107 and 107a are attached to the lower frame 102 on one side of an approximately front portion of the recliing lower plate 101. Pinions 109 and 109a rotatably attached to shafts 108 and 108a are projected on the other side from notch holes 101b and 101c, and are respectively engaged with sector gears 110 and 110a. The spring brake devices 107 and 107a have a well known structure, and respectively have operating knobs 111 and 111a, and brake mechanisms 112 and 112a. The sector gears 110 and 110a are rotatably supported by the reclining plate 101 through shaft pins 113 and 113a, respectively.

Figure 6:
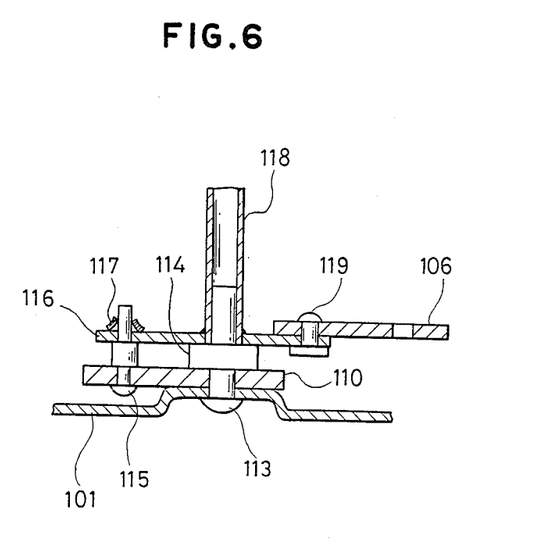
FIG. 6 is a plan view of a main portion of the seat lifter of FIG. 3.

As shown in FIG. 6, the shaft pin 113 has a flange 114 in a central portion thereof, and the sector gear 110 is rotatably disposed between the flange 114 and the reclining lower plate 101. A pin 115 extends through the sector gear 110, and a plate 116 is connected to the sector gear 110 through the pin 115 and a push nut 117. The plate 116 is fixed by welding, etc., to a connecting shaft 118, and is opposite the sector gear 110. The plate 116 is connected at an end thereof opposite the pin 115 to one end of the link 106 through a pin 119. The connecting shaft 118 is composed of a pipe, and is fitted at one end thereof to the shaft pin 113, and is inserted at the other end thereof into a hole 136 in the upper slide rail 101a. The other end of the connecting shaft 118 receives an E-ring 134 to rotatably support the connecting shaft 118. A bracket 121 is connected to the link 106a through a pin 122. The links 106 and 106a are attached to side holes 105a of brackets fixed to the upper frame 105 through stepped colars 123 and 123a and push nuts 124 and 124a.

The shaft pin 113a has a flat top, and a sector gear 110a is rotatably disposed between the shaft pin 113a and the reclining lower plate 101. A pin 125 extends through the sector gear 110a, and a link rod 126 is rotatably connected at one end thereof to the pin 125 by a push nut 127. The other end of the link rod 126 is connected to the link 106b through a pin 128 and a washer 129. The link 106b is in the shape of a bell crank, and has two support portions opposite the pin 128. One of the support portions of the link 106b is fixed by welding, etc., to one end of the connecting shaft 118a extending through a shaft hole 130 disposed in the reclining lower plate 101 by using an E-ring 131 for preventing the extraction of the connecting shaft 118a, The other of the support portions of the link 106b is connected by a shaft pin 133 to the bracket 132 attached to the upper frame 105. A link 106c and an E-ring 134a are fitted onto the other end of the connecting shaft 118a, and the links 106b and 106c constitute a pair. The link 106c is connected by a shaft pin 133a to a bracket 132a attached to the upper frame 105. The brackets 132 and 132a make contact with and are attached to a rear portion of the upper frame 105 by inserting bolts 135 and 135a into rear side holes 105.

A coil spring 137 is disposed between the pin 128 and the bracket 138 fixed to the connecting shaft 118. As shown in FIG. 5, reference numeral 139 shows a portion of a known reclining mechanism for tilting an unillustrated seat backrest at a desired angle forwards or backwards. A slide lock lever 140 extends forwards from a slide lock device 141 shown in FIG. 4.

The operation of the seat lifter mentioned above will be described next.

In FIGS. 3 and 5, when the operating knob 111 is rotated, the pinion 109 is rotated through the spring brake device 107, and the sector gear 110 is rotated by the rotation of the pinion 109. Accordingly, the plate 116 is also rotated by the rotation of the sector gear 110 in the same rotational direction as that of the sector gear 110, thereby oscillating the link 106. Accordingly, when the sector gear 110 is rotated around the shaft pin 113 in the clockwise direction, the plate 116 is rotated through the pin 115 in the same rotational direction so that the link 106 is pulled in the clockwise direction, thereby causing the upper frame 105 to approach the upper frame 102. In contrast, when the sector gear 110 is rotated around the shaft pin 113 in the counterclockwise direction, the plate 116 is rotated through the pin 115 in the counterclockwise direction so that the link 106 is rotated in the same rotational direction, thereby raising the upper frame 105 upwards. Thus, if the operating knob 111 is rotated, the front portion of the upper frame 105 can be raised. On the other hand, when the operating knob 111a is rotated, the sector gear 110a pulls or pushes the link rod 126, and the link 106b can be thereby oscillated in the forward and backward directions. Thus, when the link rod 126 is pulled, the rear portion of the upper frame 105 is raised upwards, and when the link rod 126 is pushed, the rear portion of the upper frame 105 approaches the lower frame 102. Namely, the front and rear portions of the upper frame 105 can be individually raised or lowered by the operation of the operating knobs 111 and 111a, so that an operator on the seat can independently adjust the front and/or rear portions of the seat to desired positions.

As mentioned above, in accordance with the present invention, a connecting shaft for moving a link in association therewith is not fixed by welding to a sector gear, but is fixed by welding to a plate moved in association with the sector gear rotatably supported by a lower frame through a pin. Therefore, the seat lifter has the advantage in structure that at least the connecting shaft and the reclining lower plate of the lower frame can be disassembled so that the seat lifter is suitable for the knock-down system. Accordingly, the plate is fixed by welding to the connecting shaft in advance by the manufacturer, and then the plate is connected to the sector gear through a shaft pin or a pin by the purchaser, thereby easily completing an assembly of the seat lifter. Hence, when the seat lifter is transported from the manufacturer to the purchaser, the seat lifter can be disassembled and made compact, and the volume thereof can be reduced, thereby reducing its cost of transportation.

What is claimed is:

1. a seat lifting apparatus comprising:
    a seat having opposing front and rear sides, a base frame and a seat frame;
    front and rear seat lifting means, disposed between the base frame and the seat frame for independently moving the front and rear sides of the seat frame up and down so as to adjust the height of the seat;
    front shaft means disposed in the front seat lifting means and connecting both opposite front sides of the seat to support and vertically move the front side of the seat;
    rear shaft means disposed in the rear seat lifting means and connecting both opposite rear sides of the seat to support and vertically move the rear side of the seat independently of the front shaft means;
    front engaging means disposed in the front shaft means;
    rear engaging means disposed in the rear shaft means; and
    single balance spring means connected at both ends thereof to the front and rear shaft means through the front and rear engaging means, respectively; said balance spring means balancing the lifting operation of the seat on the front and rear sides thereof such that the force of the balance spring means on the rear side of the seat is stronger than that on the front side of the seat.

2. A seat lifting apparatus as claimed in claim 1, wherein the front and rear engaging means comprise engaging members having arms on the front and rear sides of the seat, respectively, the length of the arm of the engaging member on the rear side being longer than that of the arm of the engaging member on the front end side.

3. A seat lifting apparatus as claimed in claim 1, wherein the base frame is attachable onto the chassis of a vehicle.

4. A seat lifting apparatus as claimed in claim 1 further comprising:
    gear means rotatably supported by the base frame;
    plate means rotatable in association with the rotation of the gear means and detachably attached to the gear means;
    the shaft means being disposed in the seat lifting means and fixed to the plate means, said shaft means being rotated in response to the rotation of the plate means to move the seat frame up or down.

5. A seat lifting apparatus as claimed in claim 4, wherein the plate means is detachably attached to the gear means through pin means.

6. A seat lifting apparatus as claimed in claim 5, further comprising sector means, the sector means and the plate means being coaxially rotated with each other.

7. A seat lifting apparatus as claimed in claim 5, wherein said apparatus further comprises pinion means engaged with the gear means.

8. A seat lifting apparatus as claimed in claim 4, wherein said apparatus further comprises link means rotatably attached to the plate means and supporting the seat frame.

9. A seat lifting apparatus as claimed in claim 8, wherein the upper frame is raised or lowered by the rotation of the shaft means through the link means.

10. A seat lifting apparatus comprising:
   seat lifting means disposed between a lower frame and an upper frame disposed above the lower frame and attached onto a seat side, and moving the upper frame up or down;
   gear means rotatably supported by the lower frame;
   plate means rotatable in association with the rotation of the gear means and detachably attached to the gear means;
   pin means for detachably attaching said plate means to said gear means; and
   shaft means disposed in the seat lifting means and fixed to the plate means, said shaft means being rotated by the rotation of the plate means to move the upper frame up or down.

11. A seat lifting apparatus as claimed in claim 10, wherein the gear means and the plate means are coaxially rotated with each other.

12. A seat lifting apparatus as claimed in claim 11, wherein said apparatus further comprises pinion means engaged with the gear means.

* * * * *